(12) United States Patent
Nomoto et al.

(10) Patent No.: US 11,303,772 B2
(45) Date of Patent: Apr. 12, 2022

(54) IMAGE READING APPARATUS AND ORIGINAL TRANSPORTING METHOD

(71) Applicant: SEIKO EPSON CORPORATION, Tokyo (JP)

(72) Inventors: Kosuke Nomoto, Shiojiri (JP); Makoto Wada, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/160,787

(22) Filed: Jan. 28, 2021

(65) Prior Publication Data
US 2021/0243320 A1 Aug. 5, 2021

(30) Foreign Application Priority Data

Jan. 31, 2020 (JP) .............................. JP2020-014631

(51) Int. Cl.
*H04N 1/00* (2006.01)
*H04N 1/047* (2006.01)
*H04N 1/12* (2006.01)

(52) U.S. Cl.
CPC ..... *H04N 1/00652* (2013.01); *H04N 1/00037* (2013.01); *H04N 1/00082* (2013.01);
(Continued)

(58) Field of Classification Search
CPC ........ H04N 1/193; H04N 1/12; H04N 1/1215; H04N 2201/0081; H04N 1/0464; H04N 1/1017; H04N 1/00567; H04N 1/00588; H04N 1/00602; H04N 1/00652; H04N 1/00689; H04N 1/00694; H04N 1/00713; H04N 1/00774; H04N 1/0402; H04N 1/0414; H04N 1/0443; H04N 1/1225; H04N 1/123; H04N 1/125; H04N 1/3877; H04N 1/407; H04N 1/4095; H04N 2201/04756;
(Continued)

(56) References Cited

U.S. PATENT DOCUMENTS

| | | | | |
|---|---|---|---|---|
| 5,060,925 A | * | 10/1991 | Hamakawa | ............ G03G 15/60 271/111 |
| 6,963,722 B2 | * | 11/2005 | Matsumoto | ............ B65H 33/08 399/404 |

(Continued)

FOREIGN PATENT DOCUMENTS

JP 2014-219476 11/2014

*Primary Examiner* — Negussie Worku
(74) *Attorney, Agent, or Firm* — Workman Nydegger

(57) ABSTRACT

A first transport roller that is positioned upstream of a reading member and that applies sending force to an original, a second transport roller that is positioned downstream of the reading member and that applies sending force to the original. A first transporting mode is included in a plurality of transporting modes executable by a control member. The first transporting mode includes a period in which a largest set velocity value in transporting the original while in a first state in which reading is performed while the original receives sending force from, among the first transport roller and the second transport roller, the first transport roller alone is set higher than a largest set velocity value in transporting the original while in a second state in which reading is performed while the original receives sending force from both the first transport roller and the second transport roller.

5 Claims, 9 Drawing Sheets

(52) U.S. Cl.
CPC ..... *H04N 1/00602* (2013.01); *H04N 1/00628* (2013.01); *H04N 1/00644* (2013.01); *H04N 1/00798* (2013.01); *H04N 1/047* (2013.01); *H04N 1/1215* (2013.01); *H04N 2201/0081* (2013.01); *H04N 2201/0454* (2013.01)

(58) Field of Classification Search
CPC .... H04N 1/0408; H04N 1/0455; H04N 1/047; H04N 1/1013; H04N 1/203; H04N 1/2034; H04N 1/40056; H04N 2201/0091; B65H 2220/01; B65H 2220/02; B65H 2220/03; B65H 2513/108; B65H 2513/20; B65H 2515/704; B65H 2301/4474; B65H 2220/11; B65H 2513/10; B65H 5/062; B65H 2402/46; B65H 2405/3322; B65H 2553/51; B65H 3/0684; B65H 3/68; B65H 7/02; B65H 23/1806; B65H 2511/414; B65H 7/00
USPC ....................................................... 358/1.15
See application file for complete search history.

(56) References Cited

U.S. PATENT DOCUMENTS

| | | | | |
|---|---|---|---|---|
| 7,673,876 | B1* | 3/2010 | DeGruchy | G03G 15/0131 |
| | | | | 271/264 |
| 8,020,864 | B1* | 9/2011 | Tharayil | G03G 15/6564 |
| | | | | 271/270 |
| 8,363,287 | B2* | 1/2013 | Umezawa | H04N 1/0071 |
| | | | | 358/474 |
| 8,655,212 | B2* | 2/2014 | Asaoka | G03G 15/2028 |
| | | | | 399/68 |
| 8,899,571 | B2* | 12/2014 | Nishikawa | H04N 1/00602 |
| | | | | 271/3.14 |
| 2012/0044541 | A1* | 2/2012 | Kato | H04N 1/32646 |
| | | | | 358/448 |
| 2012/0114356 | A1* | 5/2012 | Asaoka | G03G 15/6573 |
| | | | | 399/68 |
| 2013/0077137 | A1* | 3/2013 | Nishikawa | H04N 1/00588 |
| | | | | 358/498 |
| 2014/0327925 | A1 | 11/2014 | Hongo et al. | |
| 2021/0243320 | A1* | 8/2021 | Nomoto | H04N 1/00082 |

* cited by examiner

FIG. 7

| Position of Apparatus Body | Switch Lever | Type of Original | Driving Force of Separating Motor | Pressing Force of Separating Rollers | First-State Acceleration Control | Separation/Passage Deceleration Control | Discharge Deceleration Control |
|---|---|---|---|---|---|---|---|
| First Reading Position (Inclined) | Normal Position | Standard Size Paper and the Like (Wide) | Transmission State | First Pressing Force (Large) | Executed | Executed | Executed |
| | | Standard Size Paper (Narrow) | | | Not Executed | Not Executed | Executed |
| | | Carrier Sheet (Thin) | | | | | |
| | Non-Separation Position | Standard Size Paper and the Like (Wide) | Non-Transmission State | First Pressing Force (Large) | Not Executed | Not Executed | Executed |
| | | Standard Size Paper (Narrow) | | | | | |
| | | Carrier Sheet (Thin) | | | | | |
| | | Carrier Sheet (Booklet) | | | | | |
| Second Reading Position (Horizontal) | Soft Separation Position | Thin Paper | Transmission State | Second Pressing Force (Small) | Not Executed | Not Executed | Executed |

IMAGE READING APPARATUS AND ORIGINAL TRANSPORTING METHOD

The present application is based on, and claims priority from JP Application Serial Number 2020-014631, filed Jan. 31, 2020, the disclosure of which is hereby incorporated by reference herein in its entirety.

BACKGROUND

1. Technical Field

The present disclosure relates to an image reading apparatus that reads an image on an original. Furthermore, the present disclosure relates to an original transporting method in an image reading apparatus.

2. Related Art

A scanner that is an example of the image reading apparatus includes a type referred to as a flatbed scanner that performs reading by moving a read sensor relative to an original mounted on an original platen, and a type referred to as a document scanner that performs reading by moving an original relative to a read sensor provided in a fixed manner as illustrated in JP-A-2014-219476.

In such a document scanner, transport rollers are provided in an original transport path at portions upstream and downstream of the read sensor. Hereinafter, a transport roller provided upstream of the read sensor is referred to as a first transport roller, and a transport roller provided downstream of the read sensor is referred to as a second transport roller.

When the original receives sending force from both the first transport roller and the second transport roller, the sending force to the original is not likely to become insufficient; however, when the original is transported by the first transport roller alone, or when the original is transported by the second transport roller alone, there are cases in which the sending force becomes insufficient. Particularly, there are factors that apply a large transport load onto the original in a portion upstream of the first transport roller, and when the original is transported by the first transport roller alone, slipping occurs in the first transport roller and sending force becomes insufficient, which may, with a high probability, have an adverse effect on the reading result.

As the factors that apply a large transport load onto the original at the portion upstream of the first transport roller include, for example, a separating member that separates the original and, in a type in which, among a stack of originals that are mounted, the bottom original is fed, an original that is mounted above the original that is to be fed.

SUMMARY

An image reading apparatus of the present disclosure that overcomes the above issue is an image reading apparatus including a reading member that reads an image on an original, a first transport roller positioned upstream of the reading member in an original transport path through which the original is transported, the first transport roller applying sending force to the original, a second transport roller positioned downstream of the reading member in the original transport path through which the original is transported, the second transport roller applying sending force to the original, and a control member that controls the reading member, the first transport roller, and the second transport roller. In the image reading apparatus, the control member is configured to execute a plurality of transporting modes. The plurality of transporting modes include a first transporting mode that changes original transportation velocity control between a first state, in which reading is performed while the original receives sending force from, among the first transport roller and the second transport roller, the first transport roller alone, and a second state, in which reading is performed while the original receives sending force from both the first transport roller and the second transport roller. The first transporting mode includes a period in which the largest set velocity value in transporting the original while in the first state is set higher than the largest set velocity value in transporting the original while in the second state.

BRIEF DESCRIPTION OF THE DRAWINGS

FIG. 7 is a diagram illustrating details of transporting modes.

DESCRIPTION OF EXEMPLARY EMBODIMENTS

Figure 1:
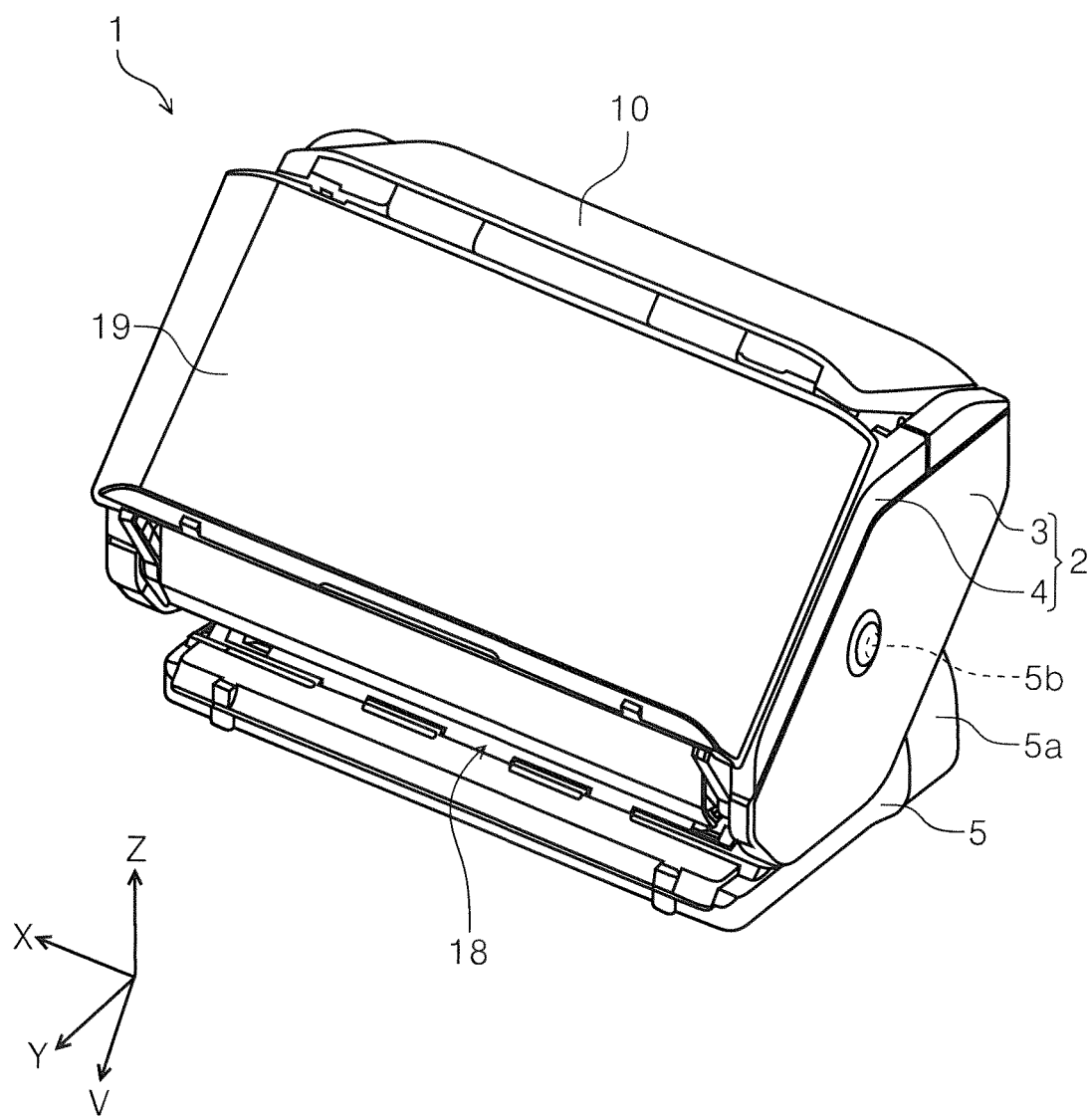
FIG. 1 is an external perspective view of a scanner, in which an apparatus body is in a second position, viewed from the front side.

Hereinafter, an outline of the present disclosure will be described.

An image reading apparatus according to a first aspect includes a reading member that reads an image on an original, a first transport roller positioned upstream of the reading member in an original transport path through which the original is transported, the first transport roller applying sending force to the original, a second transport roller positioned downstream of the reading member in the original transport path through which the original is transported, the second transport roller applying sending force to the original, and a control member that controls the reading member, the first transport roller, and the second transport roller. In the image reading apparatus, the control member is configured to execute a plurality of transporting modes. The plurality of transporting modes include a first transporting mode that changes original transportation velocity control between a first state, in which reading is performed while the original receives sending force from, among the first transport roller and the second transport roller, the first transport roller alone, and a second state, in which reading is performed while the original receives sending force from both the first transport roller and the second transport roller. The first transporting mode includes a period in which the largest set velocity value in transporting the original while in the first state is set higher than the largest set velocity value in transporting the original while in the second state.

According to the present aspect, since the first transporting mode includes the period in which the largest set velocity value in transporting the original while in the first state is set higher than the largest set velocity value in transporting the original while in the second state, the transport amount of the original when in the first state, in which the sending force of the original tends to be insufficient, is less likely to be insufficient and a satisfactory reading result can be obtained. Note that hereinafter, the original transport amount may be merely referred to as a "transport amount".

A second aspect according to the first aspect further includes an original mount portion on which an original before feeding is mounted, a feed roller that sends the original mounted on the original mount portion towards the first transport roller, and a separating roller that nips and separates a medium together with the feed roller. In the second aspect, the first transporting mode includes a period in which the largest set velocity value in transporting the original when performing reading while the original receives a transport load from the separating roller is set lower than the largest set velocity value in transporting the original when performing reading while the original does not receive a transport load from the separating roller.

When switched from the state in which the original receives a transport load from the separating roller to a state in which the original does not receive a transport load, the transport amount tends to become excessive. However, when switched from the state in which the original receives the transport load from the separating roller to the state not receiving the transport load, since the largest set velocity value in transporting the original is set low, an appropriate transport amount can be obtained and a satisfactory reading result can be obtained.

In a third aspect according to the second aspect, the first transporting mode includes a period in which the largest set velocity value in transporting the original when the original is discharged outside of the apparatus while receiving sending force from, among the first transport roller and the second transport roller, the second transport roller alone after reading is completed is set lower than the largest set velocity value in transporting the original when reading is performed while the original receives sending force from, among the first transport roller and the second transport roller, the second transport roller alone.

According to the present aspect, the original that has been read is discharged in a gentle manner and a degradation in the aligning performance of the discharged originals can be suppressed.

In a fourth aspect according to the second or third aspect, the transport load applied from the separating roller to the original that is being read is changeable, the plurality of transporting modes include a second transporting mode in which the largest set velocity value in transporting the original while in the first state is set equal to the largest set velocity value in transporting the original while in the second state, the control member selects the first transporting mode when the transport load is a first transport load, and the control member selects the second transporting mode when the transport load is a second transport load that is lower than the first transport load.

When the transport load is the first transport load, compared with when the transport load is the second transport load that is lower than the first transport load, the transport amount while in the first state tends to become insufficient. According to the present aspect, when the transport load is the first transport load, the control member selects the first transporting mode; accordingly, the transport amount is less likely to become insufficient and a satisfactory reading result can be obtained. Furthermore, when the transport load is the second transport load, the transport amount does not easily become insufficient. In such a case, when the largest set velocity value in transporting the original is set higher, the transport amount tends to become excessive; however, when the transport load is the second transport load, since the second transporting mode is selected, an appropriate transport amount can be obtained and a satisfactory reading result can be obtained.

A fifth aspect according to the first aspect further includes an original mount portion on which an original before feeding is mounted, a feed roller that comes in contact with, among originals mounted on the original mount portion, an original at a bottom, and that sends the original downstream, and a mount amount detection portion that detects an amount of original mounted on the original mount portion. In the fifth aspect, based on detected information of the mount amount detection portion, when the amount of original mounted on the original mount portion decreases, the control member lowers the largest set velocity value in transporting the original while in the first state.

When the amount of original mounted on the original mount portion increases, the transport load on the original that is being read applied from the original that is mounted above the original that is being read becomes larger and the transport amount while in the first state tends to become insufficient more easily. In other words, as the amount of original mounted on the original mount portion decreases, the transport load becomes smaller and the transport amount is less likely to become insufficient. According to the present aspect, based on the detected information of the mount amount detection portion, when the amount of original mounted on the original mount portion decreases, the control member lowers the largest set velocity value in transporting the original while in the first state; accordingly, the largest set velocity value in transporting the original while in the first state can be set in a more appropriate manner and a more satisfactory reading result can be obtained.

An original transporting method according to a sixth aspect is an original transporting method in an image reading apparatus that includes a reading member that reads an image on an original, a first transport roller positioned upstream of the reading member in an original transport path through which the original is transported, the first transport roller applying sending force to the original, a second transport roller positioned downstream of the reading member in the original transport path through which the original is transported, the second transport roller applying sending force to the original, and a control member that controls the reading member, the first transport roller, and the second transport roller. The original transporting method includes providing a period in which the largest set velocity value in transporting the original while in a first state in which reading is performed while the original receives sending force from, among the first transport roller and the second transport roller, the first transport roller alone is set higher than the largest set velocity value in transporting the original while in a second state in which reading is performed while the original receives sending force from both the first transport roller and the second transport roller.

According to the present aspect, since the period in which the largest set velocity value in transporting the original while in the first state is set higher than the largest set velocity value in transporting the original while in the second state is provided, the transport amount of the original while in the first state, in which the sending force of the original tends to be insufficient, is less likely to be insufficient and a satisfactory reading result can be obtained.

Hereinafter, the present disclosure will be described in detail.

Hereinafter, a scanner 1 configured to read at least one surface among a front surface and a back surface of an original will be illustrated as an example of the image reading apparatus. The scanner 1 is a so-called document scanner that preforms reading while moving the original relative to a reading member.

Note that in the X-Y-Z coordinate system depicted in each of the drawings, the X-axis direction is an apparatus width direction and is an original width direction. The Y-axis direction is an apparatus depth direction and is a direction extending in the horizontal direction. The Z-axis direction is a direction that extends in a vertical direction. Furthermore, the V-axis direction is an original feeding direction and is a direction that is parallel to an original transport path T. Angles formed against the Y-axis direction and the Z-axis direction in particular change depending on the position of the apparatus.

In the present exemplary embodiment, the +Y direction is a direction extending from an apparatus rear surface towards an apparatus front surface, and the −Y direction is a direction extending from the apparatus front surface towards the apparatus rear surface. Furthermore, when viewed from the apparatus front surface, the left is the +X direction and the right is the −X direction.

Furthermore, hereinafter, a direction in which the original is transported (the +V direction) may be referred to as "downstream", and a direction opposite the above (the −V direction) may be referred to as "upstream".

Referring to FIGS. 1 to 4, the scanner 1 includes an apparatus body portion 2, and a support base 5 that rotatably supports the apparatus body portion 2.

The apparatus body portion 2 includes a lower unit 3 and an upper unit 4.

Figure 4:
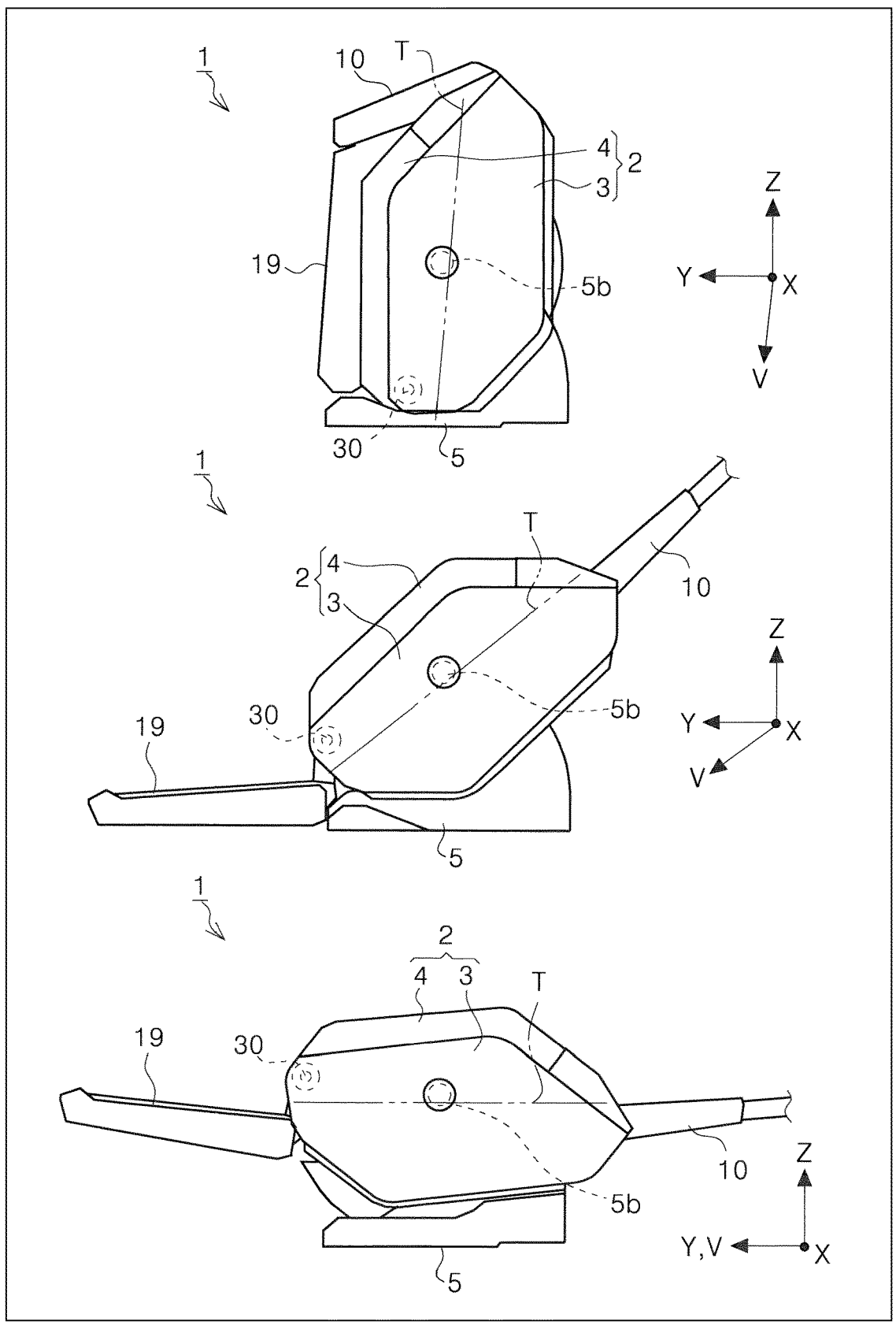
FIG. 4 illustrates variations of positions of the apparatus body.

The upper unit 4 is provided so as to be opened/closed by being rotated, relative to the lower unit 3, about a rotation shaft 30 (see FIG. 4). By being opened towards the apparatus front side, the upper unit 4 can expose an original transport path T described later.

The lower unit 3 that constitutes the apparatus body portion 2 is provided so as to be, relative to an arm portion 5a constituting the support base 5, rotatable about a rotation shaft 5b. The lower unit 3 is configured to change its position by rotation thereof.

The apparatus body portion 2 of the scanner 1 according to the present exemplary embodiment is configured to change its position and to maintain three positions with a position maintaining member (not shown). Among the three positions, two positions are taken while reading an original, and the remaining one is taken while not in use. The positions illustrated in the drawings at the middle and the bottom of FIG. 4 are some of the positions taken while reading an original. The position illustrated in the drawing at the middle of FIG. 4 is a first reading position, and the position illustrated in the drawing at the bottom of FIG. 4 is a second reading position. Furthermore, the drawing at the top of FIG. 4 is a position taken while not in use. In the position taken while not in use, the projected area of the scanner 1 on a mount surface becomes the smallest. More specifically, in the first position, the apparatus body portion 2 takes a position in which the occupied space in the Y-axis direction is the smallest.

The projected area in the first reading position is larger than that of the position taken while not in use, and the projected area in the second reading position is larger than that of the first reading position. The +V direction, which is the original feeding direction, extends obliquely downwards when in the first reading position, and the +V direction extends practically in the horizontal direction when in the second reading position. Note that in the present exemplary embodiment, the +V direction extends practically in the horizontal direction when in the second reading position; however, not limited to the horizontal direction, it is only sufficient that the second reading position is at a position where the +V direction is closer to the horizontal direction with respect to the +V direction of the first reading position.

The present exemplary embodiment is configured so that each position of the apparatus body portion 2 can be held by a holding member (not shown), and the state in which the position is maintained can be released with a release lever (not shown). Furthermore, each of the positions of the apparatus body portion 2 can be detected by a position detection portion 49 (see FIG. 5). The position detection portion 49 may be a contact type sensor or may be a noncontact type sensor. When the position detection portion 49 is a noncontact type sensor, the noncontact sensor may be configured of a rotary scale provided in the apparatus body portion 2, and an optical receiver that is provided in the support base 5 and that includes a light emitter that emits light to the rotary scale, and an optical receiver that receives the light transmitted through the rotary scale.

The upper unit 4 includes a front cover 19, and the lower unit 3 includes an upper cover 10. The front cover 19 is provided so as to be, relative to the lower unit 3 and the upper unit 4, rotatable about the rotation shaft 30, and is capable of taking a closed state illustrated in FIG. 1 and an open state illustrated in FIG. 2 with the rotation thereof. When open, the front cover 19 functions as a discharge tray that receives an original on which reading has been performed and which has been discharged thereon.

Figure 2:
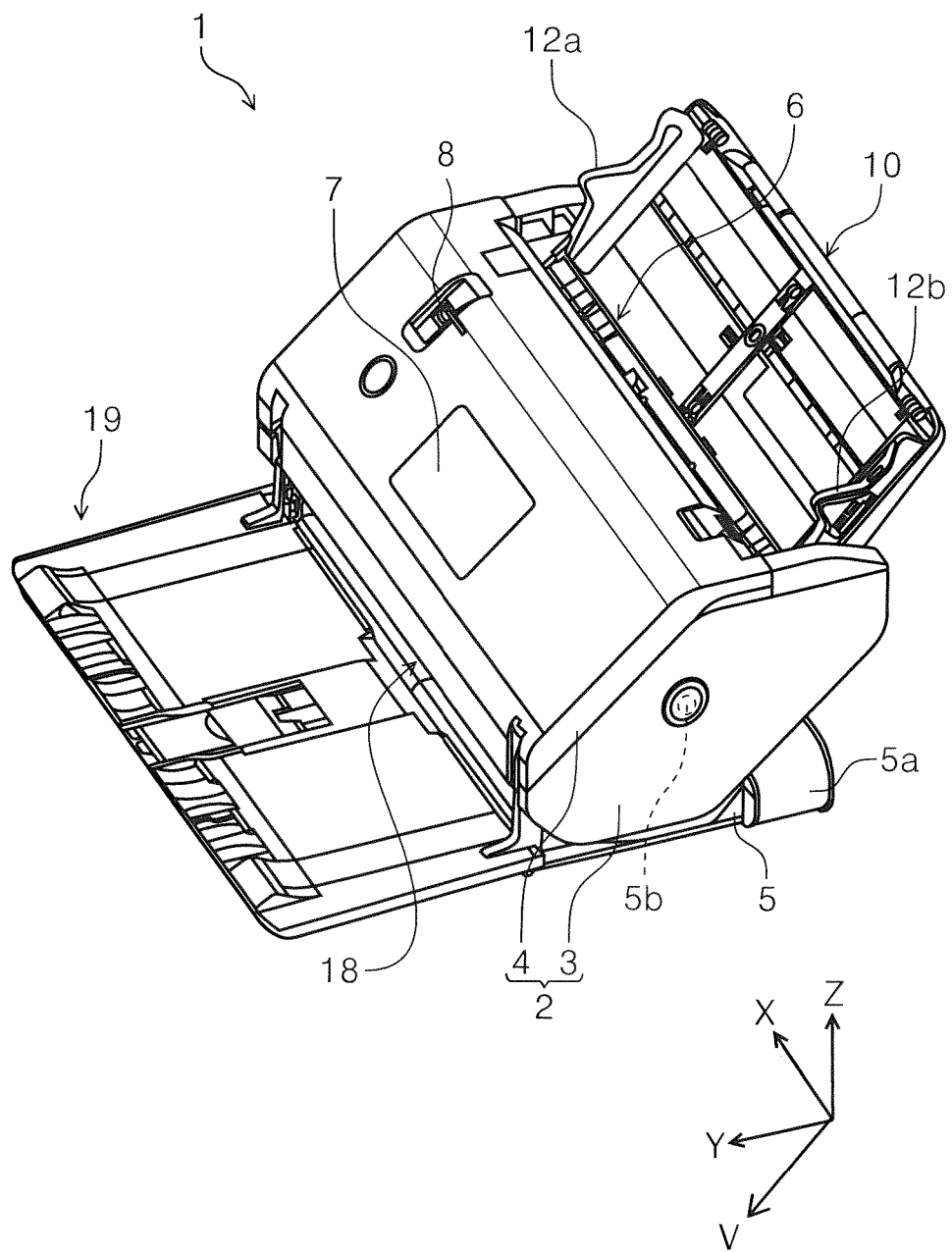
FIG. 2 is an external perspective view of the scanner, in which the apparatus body is in the second position and in which a front cover is open, viewed from the front side.

The upper unit 4 includes, as illustrated in FIG. 2, an operation panel 7 at an upper surface thereof. The operation panel 7 is implemented as a user interface in which various read settings and operation to execute a reading operation are performed and in which read settings and the like are displayed. The operation panel 7 serving as an operation portion in the present exemplary embodiment is a so-called touch panel on which both display and input can be performed, and serves both as the operation portion for performing various operations and a display portion for displaying various pieces of information. The operation panel 7 is exposed by opening the front cover 19.

As illustrated in FIG. 2, a switch lever 8 that switches the separation conditions when feeding the original is provided in the upper unit 4. The switch lever 8 is configured to switch between a "normal position" that is a neutral position, a "soft separation position" that is a position inclined in a forward direction, or in the +Y direction, from the normal position, and a "non-separation position" that is a position inclined in an apparatus depth direction, or in the −Y direction, from the normal position.

A lever detection portion 48 (see FIG. 5) serving as a position detection member that detects the position of the switch lever 8 is provided in the apparatus body portion 2. Based on a detection signal of the lever detection portion 48, a control portion 50 (see FIG. 5) is configured to detect the current position of the switch lever 8.

Note that the differences between the separation conditions of the switch lever 8 in each of the positions will be described later.

Figure 3:
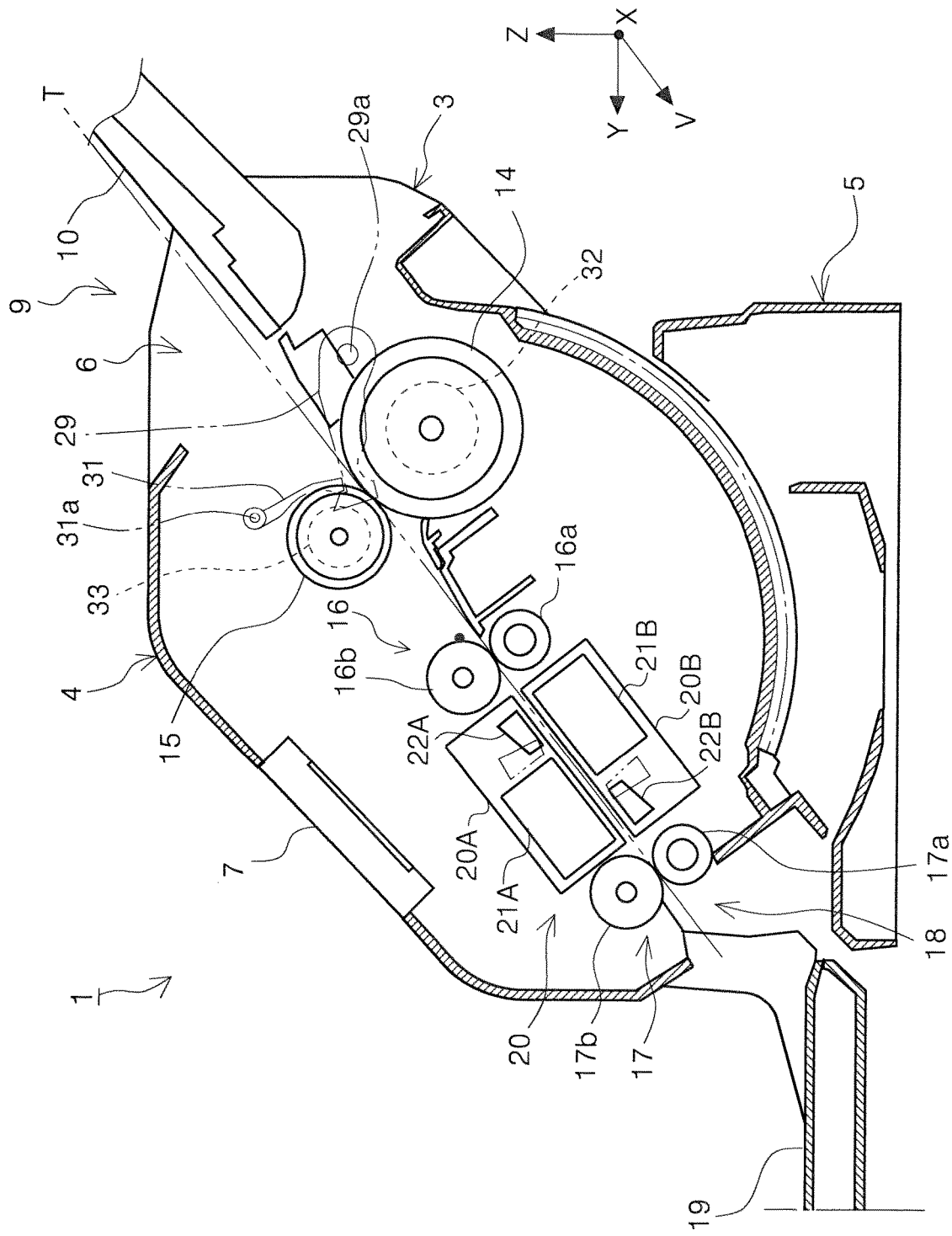
FIG. 3 is a cross-sectional view of an original transport path of the scanner viewed in a width direction, in which the apparatus body is in the second position.

The upper cover 10 serving as a medium mount portion provided on the lower unit 3 is provided in a rotatable manner relative to the lower unit 3 and, with the rotation thereof, is capable of taking a closed state as illustrated in FIG. 1 and an open state as illustrated in FIGS. 2 and 3. When open, the upper cover 10 functions as an original mount portion on which the fed original is mounted. Reference numerals 12*a* and 12*b* in FIG. 2 are edge guides that are provided in the upper cover 10 and that guide side edges of the original.

A feed port 6 continuous to the inside of the apparatus body portion 2 is provided on an upper portion of the apparatus body portion 2. The original mounted on the upper cover 10 is sent towards the inside of the apparatus body portion 2 through the feed port 6.

Referring mainly to FIG. 3, the original transport path T in the scanner 1 will be described next.

The original transport path T is a substantially linear original transport path formed between the lower unit 3 and the upper unit 4.

When the apparatus body portion 2 takes the position taken while not in use (the drawing at the top in FIG. 4), the original transport path T is closest to vertical, when the apparatus body portion 2 takes the first reading position (the drawing at the middle in FIG. 4), the original transport path T is at an inclination angle close to 45°, and when the apparatus body portion 2 takes the second reading position (the drawing at the bottom in FIG. 4), the original transport path T is practically horizontal.

The upper cover 10 described above is provided at a most upstream portion in the original transport path T, and feed rollers 14 that send the originals mounted on the upper cover 10 downstream and separating rollers 15 that nip and separate the originals with the feed rollers 14 are provided downstream of the upper cover 10. The separating rollers 15 are urged towards the feed rollers 14 with springs (not shown).

The feed rollers 14 come in contact with, among the originals mounted on the upper cover 10, the original at the bottom. Accordingly, when a plurality of originals are mounted on the upper cover 10, the originals are sequentially fed downstream from the original at the bottom.

The member depicted by reference numeral 31 is a flap. In the feeding standby state, the flap 31 prevents the original set on the upper cover 10 from coming in contact with the separating rollers 15. The flap 31 is configured to rotate about a rotation shaft 31*a*, and before feeding is started, a lower end portion thereof is engaged with a set guide 29, which stops the rotation of the flap 31 in the clockwise direction in FIG. 3. Before feeding is started, the set guide 29 supports the original so as to be in a first state, which does not allow the original to come in contact with the feed rollers 14.

Subsequently, when feeding of the original is started, the set guide 29 owing to motive power of a transport motor 58 (see FIG. 5) is rotated about a rotation shaft 29*a* in the counterclockwise direction in FIG. 3 and takes a second state in which the original is made to come in contact with the feed rollers 14. When the set guide 29 is switched to the second state from the first state, the flap 31 becomes rotatable and front ends of the stack of originals mounted on the upper cover 10 are abutted against the separating rollers 15.

Torque in a counterclockwise direction in FIG. 3, in other words, torque in a direction that sends the original downstream in the feeding direction is transmitted to the feed rollers 14 from a feed motor 57 through a one-way clutch 32. Hereinafter, a rotation direction of the feed rollers 14 when the feed rollers 14 send the original downstream is referred to as a normal direction, and a rotation direction opposite the normal direction is referred to as a reverse direction. Similarly, regarding the rotation direction of the feed motor 57, a rotation direction sending the original downstream is referred to as a normal direction, and a direction opposite the normal direction is referred to as a reverse direction.

Since the one-way clutch 32 is provided in a driving force transmission path between the feed rollers 14 and the feed motor 57, even when the feed motor 57 rotates in a reverse manner, the feed rollers 14 do not rotate in a reverse manner. Furthermore, in a state in which the feed motor 57 is stopped, the feed rollers 14 in contact with the transported original can be driven and rotated in the normal direction.

Subsequently, rotational torque is transmitted from a separation motor 59 to the separating rollers 15 through a torque limiter 33. Torque in a first rotation direction (a clockwise direction in FIG. 3) that sends the original downstream with respect to the separating rollers 15 or torque in a second rotation direction (a counterclockwise direction in FIG. 3) that returns the original upstream is transmitted to the separating rollers 15 from the separation motor 59. Hereinafter, regarding the rotation direction of each separating roller 15, the first rotation direction may be referred to as a normal direction, and the second rotation direction may be referred to as a reverse direction.

When no original is interposed between the feed rollers 14 and the separating rollers 15 or when there is a single piece of original interposed therebetween, the rotational torque of the feed rollers 14 rotating the separating rollers 15 in the normal direction exceeds an upper limit torque of the torque limiter 33, and owing to the sliding in the torque limiter 33, the separating rollers 15 are driven and rotated in the normal direction, in other words, the separating rollers 15 idle, regardless of the rotational torque from the separation motor 59.

During the original feeding operation, basically, the separation motor 59 is rotated in the reverse direction. In other words, driving torque that rotates the separating rollers 15 in the reverse direction is generated. Note that depending on the feeding mode, there are cases in which the separation motor 59 does not rotate and is at a stop.

Furthermore, in addition to the original that is to be fed, when the second original or the second original and after enter between the feed rollers 14 and the separating rollers 15, since sliding occurs between the originals, the separating rollers 15 rotate in the reverse direction with the driving torque from the separation motor 59. With the above, the second original and after that were about to be multi fed are returned upstream. In other words, multi feeding is prevented.

The upper cover 10, the feed rollers 14, and the separating rollers 15 constitute an original feeding apparatus 9 that feeds the original, which is an example of a medium. From another aspect, the original feeding apparatus 9 can be perceived as an apparatus in which a function related to reading the original (a reading portion 20 described later) is omitted from the scanner 1. Alternatively, even when equipped with the function related to reading the original (the reading portion 20 described later), from the viewpoint of feeding the original, the scanner 1 itself can be perceived as an original feeding apparatus.

Furthermore, a pair of first transport rollers 16, the reading portion 20 serving as the reading member that reads an image on an original, and a pair of second transport rollers 17 are provided downstream of the feed rollers 14. The pair of first transport rollers 16 include a first transport roller 16a that is rotated and driven by the transport motor 58 (see FIG. 5), and a first driven transport roller 16b that is driven and rotated.

The original that is nipped between the feed rollers 14 and the separating rollers 15 and that is fed downstream is nipped between the pair of first transport rollers 16 and is transported to a position opposing an upper sensor unit 20A and a lower sensor unit 20B located downstream of the pair of first transport rollers 16.

The reading portion 20 includes the upper sensor unit 20A that is positioned above the original transport path T and that is provided in the upper unit 4, and the lower sensor unit 20B that is positioned below the original transport path T and that is provided in the lower unit 3. The upper sensor unit 20A includes a sensor module 21A, and the lower sensor unit 20B includes a sensor module 21B. In the present exemplary embodiment, the sensor modules 21A and 21B are contact image sensor modules (CISMs). The sensor modules 21A and 21B are examples of a reading member that reads an image on an original.

An upper surface of the original is read by the sensor module 21A positioned above the original transport path T, and an under surface of the original is read by the sensor module 21B positioned below the original transport path T.

Note that an original reading surface (not shown) read by the upper sensor unit 20A, and an original reading surface (not shown) read by the lower sensor unit 20B are surfaces parallel to the original transport path T.

The upper sensor unit 20A includes a background plate 22A at a position that opposes the sensor module 21B included in the lower sensor unit 20B, and the lower sensor unit 20B includes a background plate 22B at a position that opposes the sensor module 21A included in the upper sensor unit 20A.

The background plates 22A and 22B are reference plates that are read by opposing sensor modules to perform shading compensation. Resin plates of a white color, a gray color, a black color, or the like or metal plates of a white color, a gray color, a black color, or the like, for example, can be used.

The background plates 22A and 22B are provided so as to be rotatable by motive power of a motor (not shown) and by rotating, the background plates 22A and 22B can switch between an opposing state illustrated by a solid line in which the background plates 22A and 22B oppose the sensor modules, and a non-opposing state illustrated by a two-dot chain line in which the opposing state is canceled. The background plates 22A and 22B are, for example, formed white. When in the opposing state, a white reference value can be obtained and when in the non-opposing state, a black reference value can be obtained.

After an image on at least one of the upper surface and the under surface of the original has been read in the reading portion 20, the original is nipped between the pair of second transport rollers 17 positioned downstream of the reading portion 20 and is discharged through a discharge port 18.

The pair of second transport rollers 17 include a second transport roller pair 17a that is rotated and driven by the transport motor 58 (see FIG. 5), and a second driven transport roller 17b that is driven and rotated. Note that in the present exemplary embodiment, circumferential velocities of the first transport roller 16a and the second transport roller 17a, in other words, the original sending velocities due to rotation are the same. Furthermore, a set velocity value in transporting the original is a value obtained when a set value of a rotating velocity of the transport motor 58 (see FIG. 5), which is the drive source of the first transport roller 16a and the second transport roller 17a, is multiplied by a predetermined coefficient.

Figure 5:
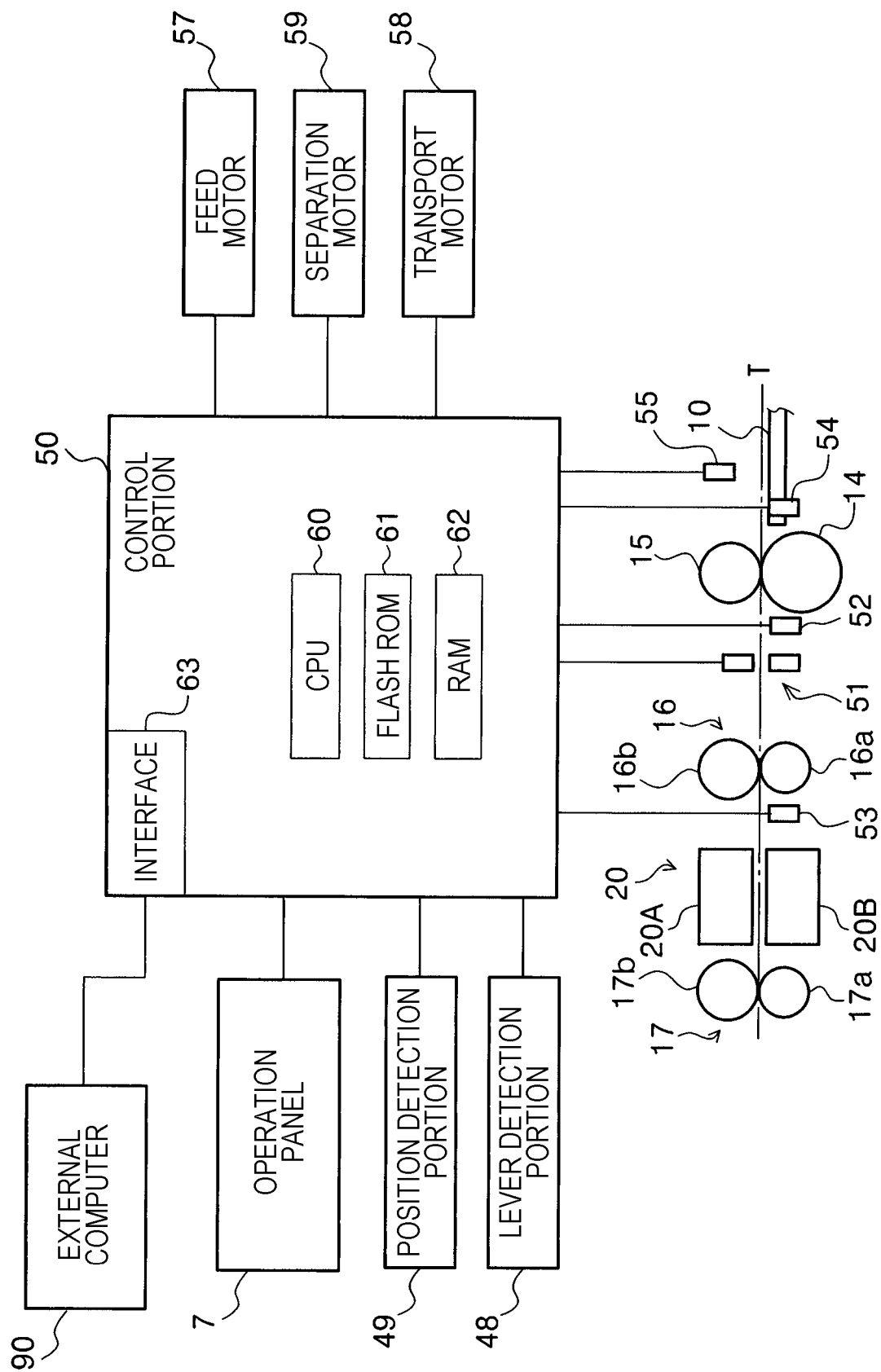
FIG. 5 is a block diagram illustrating a control system of the scanner.

Referring next to FIG. 5, a control system of the scanner 1 will be described.

The control portion 50 performs various controls related to the scanner 1 including controls related to feeding, transporting, and discharging the original and control related to reading the original. Signals from an operation panel 7 are input to the control portion 50. Signals to display the operation panel 7, in particular, signals to provide a user interface (UI) are transmitted from the control portion 50 to the operation panel 7.

The control portion 50 controls the motors such as the feed motor 57, the transport motor 58, and the separation motor 59. In the present exemplary embodiment, each of the motors is a DC motor.

Read data from the reading portion 20 is input to the control portion 50, and a signal to control the reading portion 20 is transmitted from the control portion 50 to the reading portion 20.

Signals from detection portions such as a mount detection portion 54, a mount amount detection portion 55, a multi-feed detection portion 51, a first original detection portion 52, a second original detection portion 53, the position detection portion 49, and the lever detection portion 48 are also input to the control portion 50.

Furthermore, detection values of rotary encoders (not shown) provided for the motors, namely, the feed motor 57, the transport motor 58, and the separation motor 59, are input to the control portion 50. The control portion 50 is configured to ascertain the rotation amounts of the motors with the detection values.

The control portion 50 includes a CPU 60, a flash ROM 61, and a RAM 62. The CPU 60 performs various arithmetic processing according to a program stored in the flash ROM 61 to control the operation of the entire scanner 1. The flash ROM 61, which is an example of a storage member, is a non-volatile memory that can be read and written. Furthermore, various pieces of setting information input by the user through the operation panel 7 are stored in the flash ROM 42 as well. Various pieces of information are temporarily stored in the RAM 61 that is an example of the storage member.

The control portion 50 includes an interface 63. Communication with an external computer 90 can be performed through the interface 63.

Detection portions provided in the original transport path T will be described next.

Figure 6:
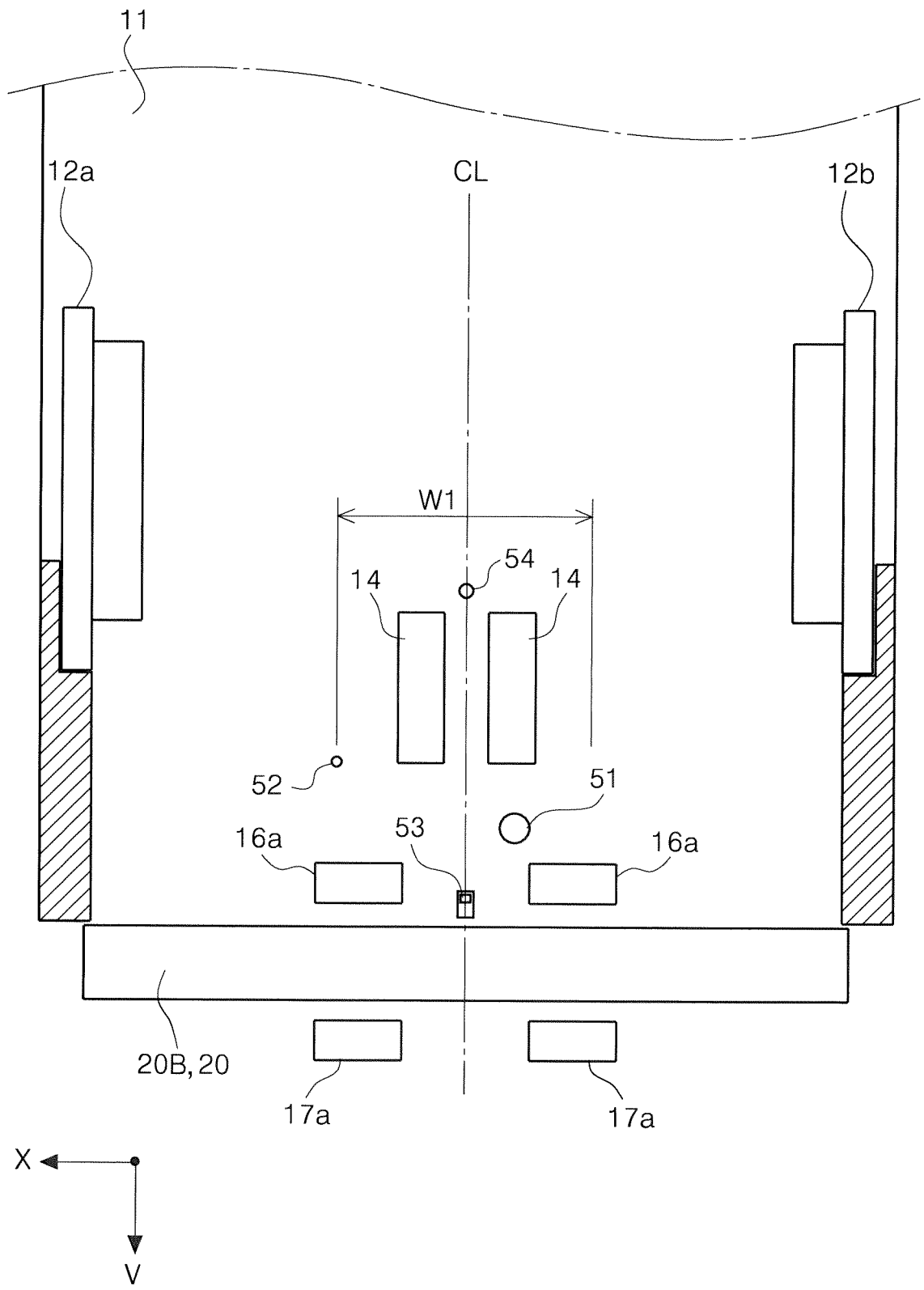
FIG. 6 is a plan view illustrating positions of sensors in an original width direction and an original transport direction.

The mount detection portion 54 is a detection portion provided upstream of the feed rollers 14. The control portion 50 can detect whether there is an original on the upper cover 10 through a signal transmitted from the mount detection portion 54. As illustrated in FIG. 6, the mount detection portion 54 is provided at a center position CL in the original width direction. Note that the edge guides 12a and 12b are both displaced at positions that are symmetrical to each other with respect to the center position CL.

Referring back to FIG. 5, the mount amount detection portion 55 is a detection portion provided upstream of the feed rollers 14 and at a position opposing the upper cover 10. The control portion 50 is configured to detect the amount of the original mounted on the upper cover 10 through a signal transmitted from the mount amount detection portion 55. While illustration of the mount amount detection portion 55 is omitted in FIG. 6, the mount amount detection portion 55 is provided at the center position CL in the original width direction.

The mount detection portion 54 and the mount amount detection portion 55 may be noncontact type sensors or may be contact type sensors.

Referring back to FIG. 5, the first original detection portion 52 is a detection portion that is provided between the feed rollers 14 and the pair of first transport rollers 16 and downstream of and in a vicinity of the nip position between the feed rollers 14 and the separating rollers 15. The control portion 50 is configured to detect the passage of the front end or the rear end of the original through a signal transmitted from the first original detection portion 52. As illustrated in FIG. 6, the first original detection portion 52 is provided in the +X direction with respect to the center position CL in the original width direction. In FIG. 6, width W1 depicts the smallest width of the original that can be detected with the first original detection portion 52.

The first original detection portion 52 may be a noncontact type sensor or may be a contact type sensor.

Referring back to FIG. 5, the multi-feed detection portion 51 is a detection portion positioned between the feed rollers 14 and the pair of first transport rollers 16, and is configured of an ultrasonic transmitting portion and an ultrasonic receiving portion that are disposed so as to oppose each other with the original transport path T in between. As illustrated in FIG. 6, the multi-feed detection portion 51 is provided in the −X direction with respect to the center position CL in the original width direction. The control portion 50 is configured to detect multi-feeding of the originals through a signal transmitted from the multi-feed detection portion 51.

Referring back to FIG. 5, the second original detection portion 53 is a detection portion provided between the pair of first transport rollers 16 and the reading portion 20. The control portion 50 can detect the passage of the front end or the rear end of the original through a signal transmitted from the second original detection portion 53. As illustrated in FIG. 6, the second original detection portion 53 is provided at the center position CL in the original width direction.

The second original detection portion 53 may be a non-contact type sensor or may be a contact type sensor.

Referring next to FIG. 7, the separation conditions and the transporting modes that are switched by operating the switch lever 8 illustrated in FIG. 2 will be described. As described above, the switch lever 8 is configured to switch between the "normal position" that is the neutral position, the "soft separation position" that is the position inclined in the forward direction, or in the +Y direction, from the normal position, and the "non-separation position" that is the position inclined in the apparatus depth direction, or in the −Y direction, from the normal position.

Feeding, transporting, and reading of the original when the switch lever 8 is in the normal position or the non-separation position are executed when the apparatus body portion 2 is in the first reading position (the drawing at the middle in FIG. 4), which is the inclined position. Feeding, transporting, and reading of the original when the switch lever 8 is in the soft separation position are executed when the apparatus body portion 2 is in the second reading position (the drawing at the bottom in FIG. 4), which is the horizontal position.

The suitable types of original when the switch lever 8 is in the normal position are standard size paper such as an A4-sized sheet and a B5-sized sheet, and a carrier sheet in which a relatively thin original is interposed therein. Other types of original are unsuitable. Note that a carrier sheet is a sheet in which two colorless and transparent sheet materials are bound together at a portion downstream in the original transport direction. By interposing an original that may cause jamming such as an irregularly shaped original, a wrinkled original, or a curled original in the carrier sheet and sending the original into the apparatus, reading can be performed in an appropriate manner. Furthermore, when the switch lever 8 is in the normal position, the carrier sheet interposing a relatively thin original therein can be fed, and feeding can be performed while a certain amount of such carrier sheets are mounted on the upper cover 10.

Note that wide standard size paper and the like in FIG. 7 denote standard size paper and the like in which the original width is at least width W1 in FIG. 6, or standard size paper and the like that has a size that is detectable with the first original detection portion 52, and narrow standard size paper and the like denote standard size paper and the like in which the original width is less than width W1 in FIG. 6, or standard size paper and the like that has a size that is not detectable with the first original detection portion 52.

Accordingly, whether the width of the fed original is wide or narrow can be determined by the detection signal of the original detection portion 52. Furthermore, whether the fed original is standard size paper or a carrier sheet can be determined by the detected information of the multi-feed detection portion 51. Alternatively, a unique identification may be provided downstream of the carrier sheet in the transport direction and the carrier sheet can be identified by reading the identification with the reading portion 20.

Note that whether the width of the fed original is wide or narrow may be determined by the information of the sheet size set by the user, or if a detection member that detects the position of the edge guides 12a and 12b (see FIG. 6) is provided, the determination can be made with the information detected by the detection member.

When the switch lever 8 is in the non-separation position, a feeding form of manually feeding the original one by one without mounting a plurality of originals on the upper cover 10 is suitable. A suitable original type when in the non-separation position is, other than the three types described above, a carrier sheet in which a booklet-form material is interposed. Note that the carrier sheet in which such a thick original is interposed is only suitable when the switch lever 8 is in the non-separation position.

When the switch lever 8 is in the soft separation position, an original that is difficult to separate and that tends to be multi-fed, for example, an original that is extremely thin, is suitable and other originals are unsuitable.

When the switch lever 8 is switched to the soft separation position, the pressing force of the spring (not shown) that presses the separating rollers 15 towards the feed rollers 14 is, with the control mechanism (not shown), set to a second pressing force that is smaller than a first pressing force when in the normal position. Note that such pressing force affects a transport load applied to the original from the separating rollers 15 while reading is performed. When a first transport load is the transport load when the pressing force is the first pressing force, a second transport load, which is the transport load when pressing force is the second pressing force, is lower than the first transport load.

Furthermore, when the switch lever 8 is switched to the non-separation position, a non-transmission state, which is a state in which the driving force from the separation motor 59 is not transmitted to the separating rollers 15, is reached with the switching mechanism (not shown). Note that the driving force from the separation motor 59 being transmitted to or not being transmitted to the separating rollers 15 affects the transport load applied to the original from the separating rollers 15 while reading is performed. When the first transport load is the transport load when in a transmission state, which is a state in which the driving force from the separation motor 59 is transmitted to the separating rollers 15, the second transport load, which is the transport load when in the non-transmission state, is lower than the first transport load.

While "first-state acceleration control", "separation/passage deceleration control", and "discharge deceleration control" in FIG. 7 will be described in detail later with reference to FIG. 9, the discharge deceleration control is executed under all conditions, and the first-state acceleration control and the separation/passage deceleration control are performed only when the position of the apparatus body portion 2 is in the first reading position, or in the inclined position, when the switch lever 8 is in the normal position, and when the type of original is wide standard size paper and the like. The transporting mode in which the first-state acceleration control in particular is performed is a "first transporting mode", and the transporting modes in which the first-state acceleration control are not performed are all a "second transporting mode".

Figure 8:
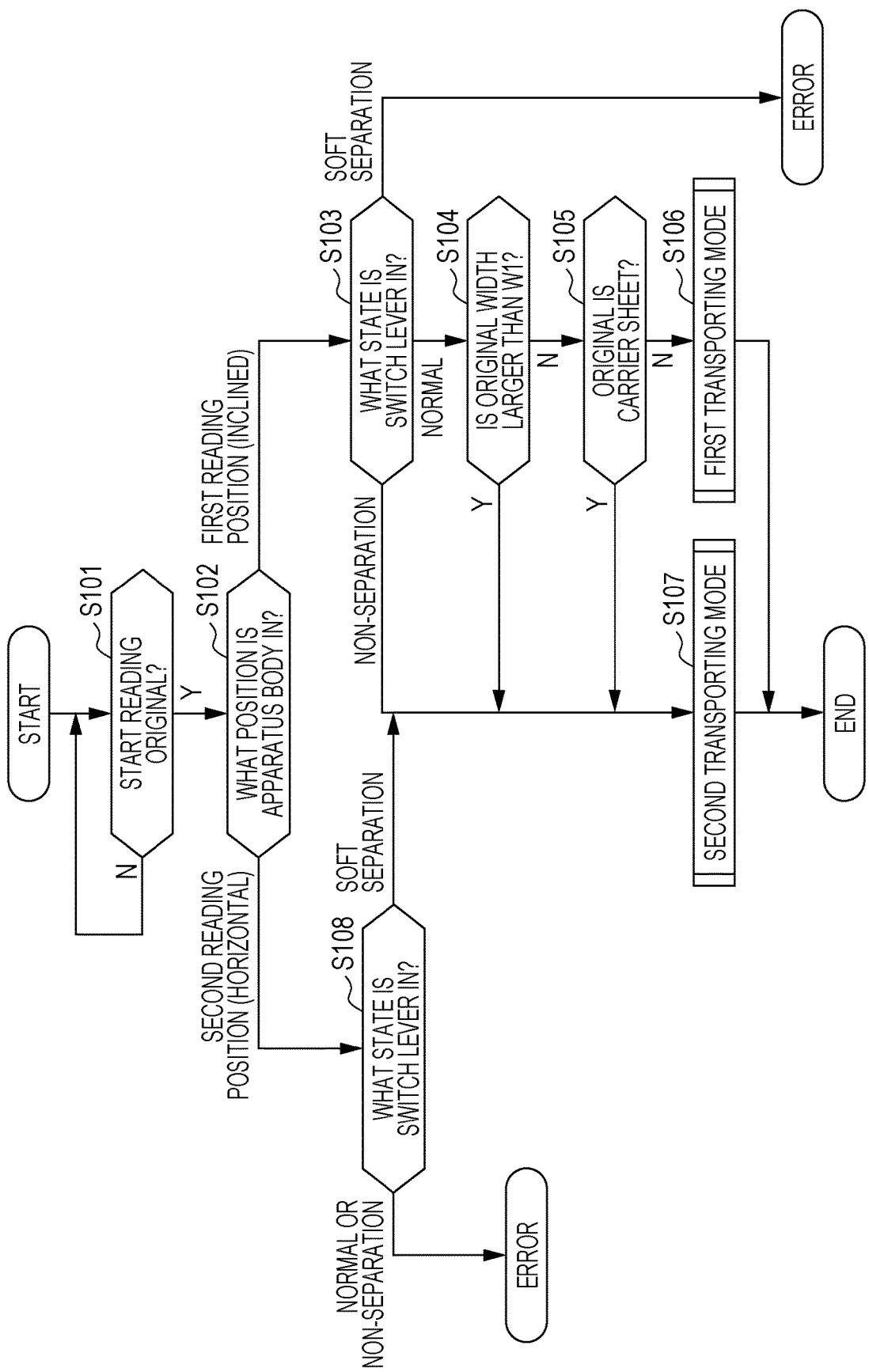
FIG. 8 is a flowchart illustrating a transporting mode determination flow.

Referring next to FIG. 8, a determination process of the transporting mode will be described.

In FIG. 8, when the control portion 50 receives an instruction to start reading the original (Yes in step S101), based on the detection signal of the position detection portion 49, the control portion 50 determines the position of the apparatus body portion 2 (step S102). As a result, when in the first reading position (the drawing at the middle in FIG. 4), the control portion 50 further determines the state of the switch lever 8 (see FIG. 2) based on the detection signal of the lever detection portion 48 (step S103).

As a result, when the switch lever 8 is in the normal position, the control portion 50 determines whether the width of the original is less than the width W1 in FIG. 6 (step S104), and when equivalent to or larger than the width W1 (No in step S104), the control portion 50 determines whether the original is a carrier sheet (step S105). Subsequently, when the original is not a carrier sheet (No in step S105), the control portion 50 selects the first transporting mode (step S106).

When the width of the original is less than the width W1 in FIG. 6 (Yes in step S104), or when the original is a carrier sheet (Yes in step S105), the control portion 50 selects the second transporting mode (step S107). Furthermore, when the switch lever 8 is in the non-separation position in step S103, the control portion 50 also selects the second transporting mode (step S107).

Note that when the switch lever 8 is in the soft separation position in step S103, an error process such as displaying an alert that the position of the apparatus body portion 2 is inappropriate is executed in the operation panel 7.

On the other hand, when the position of the apparatus body portion 2 in step S102 is the second reading position (the drawing at the bottom in FIG. 4), the control portion 50 further determines, based on the detection signal of the lever detection portion 48, the state of the switch lever 8 (see FIG. 2) (step S108). As a result, when the switch lever 8 is in the soft separation position, the control portion 50 selects the second transporting mode (step S107).

Note that when the switch lever 8 (see FIG. 2) is in the normal position or in the non-separation position in step S108, the control portion 50 performs an error process, such as displaying an alert that the position of the apparatus body portion 2 is inappropriate, in the operation panel 7.

Note that the instruction to start reading the original is received when the apparatus body portion 2 is in the first reading position or is in the second reading position, and when the apparatus body portion 2 is in the position taken while not in use (the drawing at the top in FIG. 4), the instruction to start reading the original is not received.

First Transporting Mode

Figure 9:
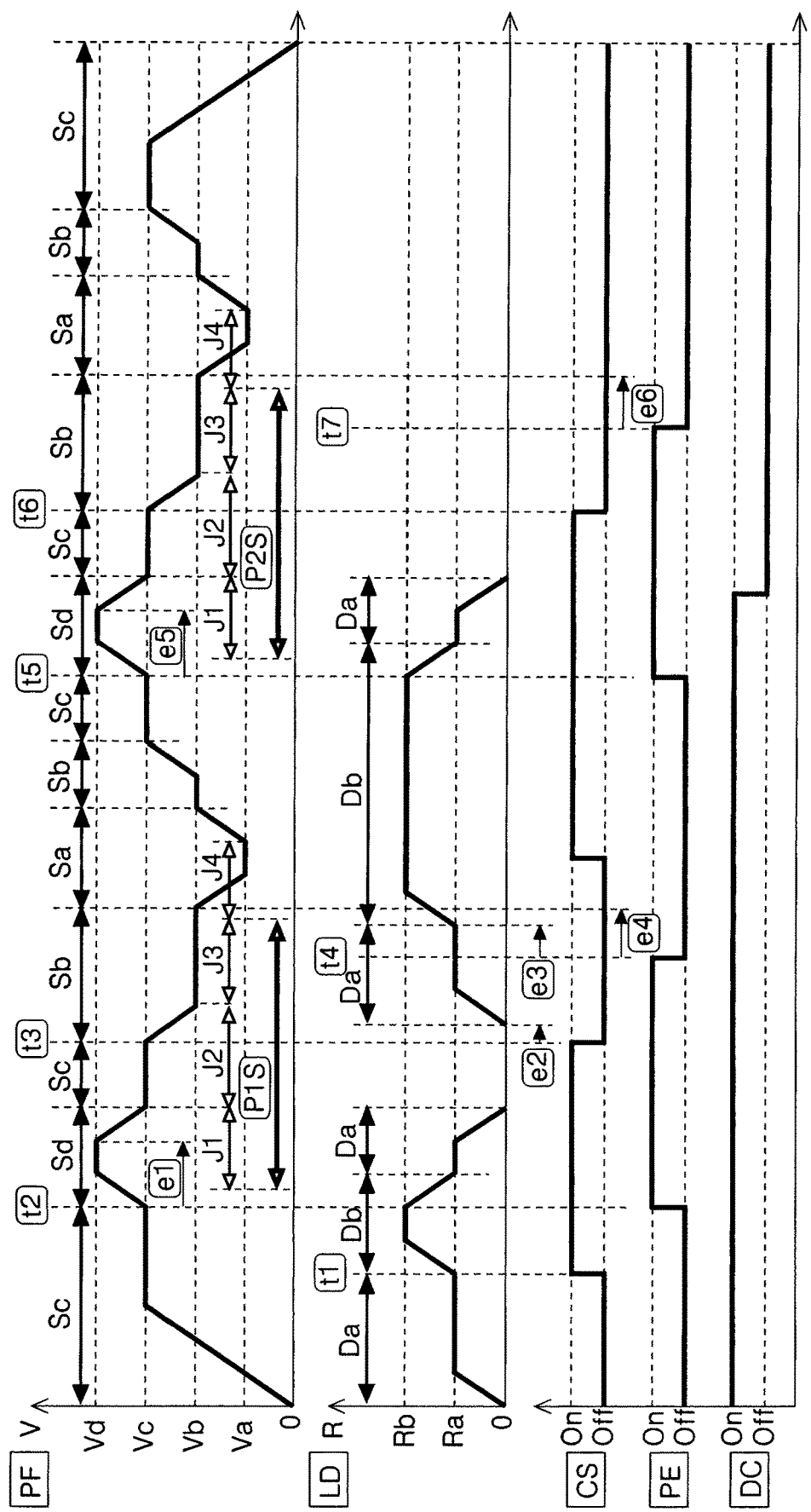
FIG. 9 is a timing chart illustrating changes in states of motors and sensors in a first transporting mode.

Referring to FIG. 9, the first transporting mode that is executed in a state in which the apparatus body portion 2 is in the first reading position (the drawing at the middle in FIG. 4) and in which the switch lever 8 is in the normal position will be described. FIG. 9 is a timing chart of each element when, as an example, two originals are read, and the axis of abscissa is time.

In FIG. 9, "PF" illustrates changes in a set velocity value V of the transport motor 58, and in the present exemplary embodiment, the set velocity value V of the transport motor 58 can take 0 (stoppage), velocity Va, velocity Vb that is faster than velocity Va, velocity Vc that is faster than velocity Vb, and velocity Vd that is faster than velocity Vc.

Sections Sa in the axis of abscissa are sections including a constant velocity section having the set velocity value Va, a deceleration section decelerated towards the set velocity value Va, and an acceleration section accelerated from the set velocity value Va.

Sections Sb in the axis of abscissa are sections including a constant velocity section having the set velocity value Vb, and at least either one of a deceleration section decelerated towards the set velocity value Vb and an acceleration section accelerated from the set velocity value Vb.

Sections Sc in the axis of abscissa are sections including a constant velocity section having the set velocity value Vc, and a constant velocity section having the set velocity value Vc and at least either one of an acceleration section accelerated towards the set velocity value Vc and a deceleration section decelerating from the set velocity value Vc.

Sections Sd in the axis of abscissa are sections including a constant velocity section having the set velocity value Vd, an acceleration section accelerated towards the set velocity value Vd, and a deceleration section decelerating from the set velocity value Vd.

In FIG. 9, "LD" illustrates changes in a set velocity value R of the feed motor 57, and in the present exemplary embodiment, the set velocity value R of the feed motor 57 can take 0 (stoppage), velocity Ra, and velocity Rb that is faster than velocity Ra.

Sections Da in the axis of abscissa are sections including a constant velocity section having the set velocity value Ra and at least either one of an acceleration section accelerating towards the set velocity value Ra and a deceleration section decelerating from the set velocity value Ra.

Sections Db in the axis of abscissa are sections including a constant velocity section having the set velocity value Rb, an acceleration section accelerated towards the set velocity value Rb, and a deceleration section decelerating from the set velocity value Rb.

In FIG. 9, "CS" illustrates an example of output signals of the first original detection portion 52, "PE" illustrates an example of output signals of the second original detection portion 53, and "DC" illustrates an example of output signals of the mount detection portion 54. In the output signals of each detection portion, "On" indicates a state in which the original is detected, and "Off" indicates a state in which the original is undetected.

In FIG. 9, when receiving an instruction to read the original, the control portion 50 starts to drive the transport motor 58 and the feed motor 57. Note that hereinafter, the operation of the separation motor 59 will be omitted.

When a front end of a first original P1 reaches the first original detection portion 52 (timing t1), the set velocity value R of the feed motor 57 is set to velocity Rb, which is the highest velocity. With the above, the front end of the original reaches the pair of first transport rollers 16 in a prompt manner.

Note that at timing t1, the set velocity value V of the transport motor 58 is set to velocity Vc.

Subsequently, when the front end of the first original P1 reaches the second original detection portion 53 (timing t2), the set velocity value V of the transport motor 58 is set to velocity Vd, which is the highest velocity. Furthermore, the deceleration control of the feed motor 57 is started at timing t2, and passing through velocity Ra, the feed motor 57 is decelerated to velocity 0.

Furthermore, slightly lagging behind timing t2, reading of the first original P1 is started. Section P1S is a section in which reading of the first original P1 is performed.

Furthermore, section J1 in FIG. 9 is a section in a state (hereinafter, referred to as a "first state") in which reading is performed while the original receives sending force from, among the first transport roller 16a and the second transport roller 17a, the first transport roller 16a alone.

Section J2 is a section in a state (hereinafter, referred to as a "second state") in which reading is performed while the original receives sending force from both the first transport roller 16a and the second transport roller 17a.

Section J3 is a section in a state (hereinafter, referred to as a "third state") in which reading is performed while the original receives sending force from, among the first transport roller 16a and the second transport roller 17a, the second transport roller 17a alone.

Section J4 is a section in a state (hereinafter, referred to as a "fourth state") in which, after reading has been completed, discharge of the original to the outside of the apparatus is performed while the original receives sending force from, among the first transport roller 16a and the second transport roller 17a, the second transport roller 17a alone.

After time e1 has passed from timing t2, the control portion 50 starts the deceleration control of the transport motor 58 and decelerates the transport motor 58 to velocity Vc. The above time e1 is set so that the set velocity value V of the transport motor 58 decelerates to velocity Vc at the timing at which the front end of the original reaches the second transport roller 17a, in other words, at a timing at which switching from section J1 to section J2 takes place. Alternatively, time e1 is set so that the set velocity value V of the transport motor 58 decelerates to velocity Vc at the timing slightly earlier than the timing at which the front end of the original reaches the second transport roller 17a, in other words, at the timing at which the switching from section J1 to section J2 takes place.

As it is apparent from FIG. 9, velocity Vd is the largest set velocity value in section J1 in the first state, and velocity Vc is the largest set velocity value in section J2 in the second state. The "first-state acceleration control" in FIG. 7 is control including a section of velocity Vd, which is faster than velocity Vc, in section J1 in the first state.

Subsequently, when a rear end of the original passes through the first original detection portion 52 (timing t3), the control portion 50 starts the deceleration control of the transport motor 58 and decelerates the transport motor 58 to velocity Vb. Note that the rear end of the first original P1 has passed through the first original detection portion 52 means, in other words, that the first original P1 definitely does not receive the transport load from the separating rollers 15 anymore.

As described above, the "separation/passage deceleration control" in FIG. 7 is, as described above, the control of setting the largest set velocity value of the transport motor 58 when reading the original that is not receiving the transport load from the separating rollers 15 to velocity Vb, which is lower than the largest set velocity value Vc of the transport motor 58 when reading the original that is receiving the transport load from the separating rollers 15.

Note that when the rear end of the original passes through the first original detection portion 52 (timing t3), the control portion 50 starts driving of the feed motor 57, or starts feeding of a second original P2 after an elapse of time e2.

Subsequently, when the rear end of the first original P1 passes through the second original detection portion 53 (timing t4), the control portion 50 starts the deceleration control of the transport motor 58 after an elapse of time e4 and decelerates the transport motor 58 to velocity Va. The above time e4 is set so that the deceleration control towards velocity Va is started slightly after the timing at which the reading operation of the first original P1 is completed.

The original that has been read is discharged while receiving the sending force from the second transport roller 17a alone. The largest set velocity value of the transport motor 58 during the above is set to Va that is lower than the largest set velocity value Vb when reading is performed while receiving the sending force from the second transport roller 17a alone. Such control is the "discharge deceleration control" in FIG. 7.

Note that after an elapse of time e3 from timing t4, the control portion 50 starts control of accelerating the feed motor 57 towards velocity Rb.

The reading of the second original P2 is subsequently performed in a similar manner. Section P2S is a section in which reading of the second original P2 is performed. Timings t5, t6, and t7 pertaining to the second original P2 correspond to the timings t2, t3, and t4, respectively, pertaining to the first original P1. Furthermore, times e5 and e6 pertaining to the second original P2 correspond to the times e1 and e4, respectively, pertaining to the first original P1.

Second Transporting Mode

The first-state acceleration control and the separation/passage deceleration control are performed in the first transporting mode described above. Conversely, the first-state acceleration control and the separation/passage deceleration control are both not performed in the second transporting mode. In other words, the second transporting mode is a mode in which the largest set velocity value in transporting the original while in the first state is set the same as the largest set velocity value in transporting the original while in the second state.

Accordingly, the set velocity values of the transport motor 58 in section J1 in the first state, section J2 in the second state, and section J3 in the third state do not change. In section J1 in the first state, section J2 in the second state, and section J3 in the third state, the transporting modes in which the set velocity values of the transport motor 58 do not change are all second transporting modes.

As described above, the control portion 50 serving as a control member is configured to execute a plurality of transporting modes. The plurality of transporting modes include the first transporting mode that changes the original transportation velocity control between the first state, in which reading is performed while the original receives sending force from, among the first transport roller 16*a* and the second transport roller 17*a*, the first transport roller 16*a* alone, and the second state, in which reading is performed while the original receives sending force from both the first transport roller 16*a* and the second transport roller 17*a*. Furthermore, the first-state acceleration control described above is performed in the first transporting mode. In other words, a period in which the largest set velocity value in transporting the original while in the first state is set higher than the largest set velocity value in transporting the original while in the second state is included. In the above exemplary embodiment, the largest set velocity value Vd in transporting the original while in the first state is higher than the largest set velocity value Vc in transporting the original while in the second state.

Accordingly, a transport amount of the original while in the first state in which the sending force of the original tends to become insufficient, or while in a state in which the original receives sending force from only the first transport roller 16*a*, is less likely to be insufficient and a satisfactory reading result can be obtained.

Furthermore, the separation/passage deceleration control described above is performed in the first transporting mode. In other words, a period in which the largest set velocity value in transporting the original when performing reading while the original receives a transport load from the separating rollers 15 is lower than the largest set velocity value in transporting the original when performing reading while the original does not receive a transport load from the separating rollers is included. In the above exemplary embodiment, the largest set velocity value Vb in transporting the original when performing reading while the original does not receive a transport load from the separating rollers 15 is lower than the largest set velocity value Vc in transporting the original when performing reading while the original receives a transport load from the separating rollers 15.

In other words, while the transport amount tends to become excessive when the original is switched from a state receiving a transport load from the separating rollers 15 to a state not receiving the transport load, an appropriate transport amount can be obtained and a satisfactory reading result can be obtained by the control described above.

Furthermore, the discharge deceleration control described above is performed in the first transporting mode. In other words, the first transporting mode includes a period in which the largest set velocity value in transporting the original when the original is discharged to the outside of the apparatus while receiving sending force from, among the first transport roller 16*a* and the second transport roller 17*a*, the second transport roller 17*a* alone after reading has been completed is set lower than the largest set velocity value in transporting the original when reading is performed while the original receives sending force from, among the first transport roller 16*a* and the second transport roller 17*a*, the second transport roller 17*a* alone.

In the exemplary embodiment described above, the largest set velocity value Va in transporting the original when the original is discharged to the outside of the apparatus while receiving sending force from, among the first transport roller 16*a* and the second transport roller 17*a*, the second transport roller 17*a* alone is set lower than the largest set velocity value Vb in transporting the original when reading is performed while the original receives sending force from, among the first transport roller 16*a* and the second transport roller 17*a*, the second transport roller 17*a* alone.

With the above, the original is discharged in a gentle manner and a degradation in the aligning performance of the discharged originals can be suppressed.

Note that referring to FIG. 7, when comparing between when wide standard size paper and the like are read while the apparatus body portion 2 is in the first reading position or in the inclined position, and the switch lever 8 is in the normal position, and when wide standard size paper and the like are read while the apparatus body portion 2 is in the second reading position or in the horizontal position, and the switch lever 8 is in the soft separation position, the pressing force of the separating rollers 15 is different or, in other words, the transport load applied to the original from the separating rollers 15 during reading is different. Accordingly, it can be said that the transport load applied to the original from the separating rollers 15 during reading can be changed by switching the switch lever 8.

Furthermore, when the first transport load is the transport load applied to the original from the separating rollers 15 when the switch lever 8 is in the normal position, it can be said that the transport load applied to the original from the separating rollers 15 when the switch lever 8 is in the soft separation position is the second transport load that is lower than the first transport load. Furthermore, it can be said that the first transporting mode that performs the first-state acceleration control is selected when the first transport load is the transporting load, and the second transporting mode that does not perform the first-state acceleration control is selected when the second transport load is the transport load.

Note that referring to FIG. 7, when comparing between when wide standard size paper and the like are read while the apparatus body portion 2 is in the first reading position and the switch lever 8 is in the normal position, and when the apparatus body portion 2 is in the first reading position and the switch lever 8 is in the non-separation position, the state in which the separating rollers 15 are driven is different; accordingly, the transport load applied to the original from the separating rollers 15 during reading is different. Accordingly, it can be said that the transport load applied to the original from the separating rollers 15 during reading can be changed by switching the state in which the separating rollers 15 are driven.

Furthermore, when the first transport load is the transport load applied to the original from the separating rollers 15 when the switch lever 8 is in the normal position, it can be said that the transport load applied to the original from the separating rollers 15 when the switch lever 8 is in the non-separation position is the second transport load that is lower than the first transport load. Furthermore, it can be said that the first transporting mode that performs the first-state acceleration control is selected when the first transport load is the transporting load, and the second transporting mode that does not perform the first-state acceleration control is selected when the second transport load is the transport load.

In other words, when the transport load is the first transport load, compared with when the transport load is the second transport load, which is lower than the first transport load, the transport amount tends to become insufficient when in the first state; however, since the first transporting mode is selected when the transport load is the first transport load, in other words, since the first-state acceleration control is performed, the transport amount does not easily become insufficient and a satisfactory reading result can be obtained.

Furthermore, when the transport load is the second transport load, the transport amount does not easily become insufficient. In such a case, when the largest set velocity value in transporting the original is set higher, in other words, when the first-state acceleration control is performed, the transport amount tends to become excessive; however, when the transport load is the second transport load, since the second transporting mode is selected, in other words, since the first-state acceleration control is not performed, an appropriate transport amount can be obtained and a satisfactory reading result can be obtained.

Note that as described while referring to FIG. 5, the mount amount detection portion 55 that detects the mounted amount of original on the upper cover 10 is provided in the present exemplary embodiment. It is also suitable that, based on the detected information of the mount amount detection portion 55, the control portion 50 adjusts the largest set velocity value Vd in the first-state acceleration control. More specifically, when the amount of original mounted on the upper cover 10 decreases, the largest set velocity value Vd is lowered. In other words, the largest set velocity value Vd is allowed to be changed within a predetermined range and control is performed such that when the amount of original mounted on the upper cover 10 is at its maximum, the largest set velocity value Vd takes the upper limit, and when the amount of original mounted on the upper cover 10 is at its minimum, the largest set velocity value Vd takes the lower limit.

In other words, when the amount of original mounted on the upper cover 10 increases, the transport load on the original that is being read applied from the original that is mounted above the original that is being read becomes larger and the transport amount while in the first state tends to become insufficient more easily. Accordingly, based on the detected information of the mount amount detection portion 55, by adjusting the largest set velocity value Vd, the largest set velocity value Vd in transporting the original while in the first state can be set in a more appropriate manner and a more satisfactory reading result can be obtained.

Note that when such control is not performed, the mount amount detection portion 55 may be omitted from the apparatus configuration.

The present disclosure is not limited to the exemplary embodiments described above and various modifications can be made within the scope of the disclosure stated in the claims, which are, naturally, also included in the scope of the present disclosure.

For example, in FIG. 7, the first-state acceleration control, the separation/passage deceleration control, and the discharge deceleration control are all performed when the apparatus body portion 2 is in the first reading position, the switch lever 8 is in the normal position, and the original type is wide standard size paper and the like; however, the separation/passage deceleration control and the discharge deceleration control may be omitted, or the discharge deceleration control alone may be omitted.

Furthermore, in FIG. 9, the first-state acceleration control includes an acceleration section so that the velocity Vd is reached in section J1 in the first state, and the constant speed section having the velocity Vd is a portion of section J1; however, the constant speed section having the velocity Vd may occupy the entire section J1.

What is claimed is:
1. An image reading apparatus comprising:
a reading member that reads an image on an original;
a first transport roller positioned upstream of the reading member in an original transport path through which the original is transported, the first transport roller applying sending force to the original;
a second transport roller positioned downstream of the reading member in the original transport path through which the original is transported, the second transport roller applying sending force to the original;
an original mount portion on which an original before feeding is mounted;
a feed roller that sends the original mounted on the original mount portion towards the first transport roller;
a separating roller that nips and separates a medium together with the feed roller; and
a control member that controls the reading member, the first transport roller, and the second transport roller, wherein
the control member is configured to execute a plurality of transporting modes,
the plurality of transporting modes include a first transporting mode that changes original transportation velocity control between a first state, in which reading is performed while the original receives sending force from, among the first transport roller and the second transport roller, the first transport roller alone, and a second state, in which reading is performed while the original receives sending force from both the first transport roller and the second transport roller, and
the first transporting mode includes a period in which a largest set velocity value in transporting the original while in the first state is set higher than a largest set velocity value in transporting the original while in the second state,
wherein,
the first transporting mode includes a period in which the largest set velocity value in transporting the original when preforming reading while the original receives a transport load from the separating roller is set lower than the largest set velocity value in transporting the original when performing reading while the original does not receive the transport load from the separating roller.

2. The image reading apparatus according to claim 1 wherein the first transporting mode includes a period in which largest set velocity value in transporting the original when the original is discharged outside of the apparatus while receiving sending force from, among the first transport roller and the second transport roller, the second transport roller alone after reading is completed is set lower than =e largest set velocity value in transporting the original when reading is performed while the original receives sending force from, among the first transport roller and the second transport roller, the second transport roller alone.

3. The image reading apparatus according to claim 1, wherein
the transport load applied from the separating roller to the original that is being read is changeable,
the plurality of transporting modes include a second transporting mode in which the largest set velocity value in transporting the original while in the first state is set equal to the largest set velocity value in transporting the original while in the second state,
the control member selects the first transporting mode when the transport load is a first transport load, and the control member selects the second transporting mode when the transport load is a second transport load that is lower than the first transport load.

4. The image reading apparatus according to claim 1, further comprising:
  an original mount portion on which an original before feeding is mounted;
  a feed roller that comes in contact with, among originals mounted on the original mount portion, an original at a bottom, and that sends the original downstream; and
  a mount amount detection portion that detects an amount of original mounted on the original mount portion, wherein
  based on detected information of the mount amount detection portion, when the amount of original mounted on the original mount portion decreases, the control member lowers the largest set velocity value in transporting the original while in the first state.

5. An original transporting method in an image reading apparatus that includes a reading member that reads an image on an original, a first transport roller positioned upstream of the reading member in an original transport path through which the original is transported, the first transport roller applying sending force to the original, a second transport roller positioned downstream of the reading member in the original transport path through which the original is transported, the second transport roller applying sending force to the original, an original mount portion on which an original before feeding is mounted, a feed roller that sends the original mounted on the original mount portion towards the first transport roller, a separating roller that nips and separates a medium together with the feed roller, and a control member that controls the reading member, the first transport roller, and the second transport roller, the original transporting method comprising:
  executing by the control member a first transporting mode to control the image reading apparatus, the first transporting mode comprising:
    a period in which a largest set velocity value in transporting the original while in a first state in which reading is performed while the original receives sending force from, among the first transport roller and the second transport roller, the first transport roller alone is set higher than a largest set velocity value in transporting the original while in a second state in which reading is performed while the original receives sending force from both the first transport roller and the second transport roller, and,
    a period in which the largest set velocity value in transporting the original when performing reading while the original receives a transport load from the separating roller is set lower than the largest set velocity value in transporting the original when performing reading while the original does not receive the transport load from the separating roller.

* * * * *